(12) United States Patent
Kim

(10) Patent No.: US 9,342,171 B2
(45) Date of Patent: May 17, 2016

(54) TOUCH PANEL WITH FIRST AND SECOND ELECTRODES EXTENDING IN THE SAME DIRECTION BUT ON OPPOSITE SURFACES OF A SUBSTRATE

(71) Applicant: LG INNOTEK CO., LTD., Seoul (KR)

(72) Inventor: Kab Young Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 43 days.

(21) Appl. No.: 14/109,198

(22) Filed: Dec. 17, 2013

(65) Prior Publication Data

US 2014/0168542 A1  Jun. 19, 2014

(30) Foreign Application Priority Data

Dec. 17, 2012  (KR) .................. 10-2012-0147831

(51) Int. Cl.
*G06F 3/041* (2006.01)
(52) U.S. Cl.
CPC ..................................... *G06F 3/041* (2013.01)
(58) Field of Classification Search
CPC .. G06F 3/041; G06F 2203/04111–2203/04113
See application file for complete search history.

(56) References Cited

U.S. PATENT DOCUMENTS

| 2008/0252608 | A1* | 10/2008 | Geaghan | 345/173 |
|---|---|---|---|---|
| 2011/0050624 | A1* | 3/2011 | Lee et al. | 345/174 |
| 2012/0182261 | A1* | 7/2012 | Wang et al. | 345/174 |
| 2012/0299638 | A1* | 11/2012 | Han | 327/517 |
| 2013/0120287 | A1* | 5/2013 | Oh | G06F 3/0418 345/173 |
| 2014/0104199 | A1* | 4/2014 | Lee | G06F 3/044 345/173 |

* cited by examiner

*Primary Examiner* — Liliana Cerullo
(74) *Attorney, Agent, or Firm* — Saliwanchik, Lloyd & Eisenschenk

(57) ABSTRACT

A touch panel includes: a cover window; a first substrate on the cover window; a second substrate on the first substrate; a first sensing electrode extending in a first direction on one surface of the first substrate; a second sensing electrode extending in the first direction on an opposite surface of the first substrate; and a third sensing electrode extending in a second direction other than the first direction on at least one of one surface and an opposite surface of the second substrate, wherein the first sensing electrode and the second sensing electrode are disposed on a region where the first sensing electrode and the second sensing electrode are offset from each other.

9 Claims, 4 Drawing Sheets

TOUCH PANEL WITH FIRST AND SECOND ELECTRODES EXTENDING IN THE SAME DIRECTION BUT ON OPPOSITE SURFACES OF A SUBSTRATE

CROSS-REFERENCE TO RELATED APPLICATION

This application claims the benefit under 35 U.S.C. §119 of Korean Patent Application No. 10-2012-0147831, filed Dec. 17, 2012, which is hereby incorporated by reference in its entirety.

BACKGROUND

The disclosure relates to a touch panel.

Recently, a touch window, which performs an input function through the touch of an image displayed on a display device by an input device such as a stylus pen or a finger, has been applied to various electronic appliances.

The touch window may be representatively classified into a resistive type touch window and a capacitive type touch window. In the resistive type touch window, the position of the touch point is detected by detecting the variation of resistance according to the connection between electrodes when pressure is applied to an input device. In the capacitive type touch window, the position of the touch point is detected by detecting the variation in capacitance between electrodes when a finger of the user is touched on the capacitive type touch window.

In the resistive type touch window, the repeated use thereof may degrade the performance thereof, and cause scratches. Accordingly, the interest on the capacitive type touch window representing superior endurance and having a long lifespan is increased.

Such a touch panel includes a capacitance type sensing electrode in a single layer or two layers. That is, sensing electrodes crossing each other may be prepared in a single layer or may be prepared in two layers by aligning the sensing electrodes in mutually different layers.

However, after the sensing electrodes are formed, when wire electrodes connecting the sensing electrodes are connected, an area of the wire electrode is increased. Accordingly, a bezel area is increased at left and right portions of the touch panel.

Accordingly, a touch panel capable of reducing an area of the wire electrode upon formation of the wire electrode is required.

BRIEF SUMMARY

The embodiment provides a touch panel having a new structure capable of reducing a bezel region.

According to the embodiment, there is provided a touch panel including: a cover window; a first substrate on the cover window; a second substrate on the first substrate; a first sensing electrode extending in a first direction on one surface of the first substrate; a second sensing electrode extending in the first direction on an opposite surface of the first substrate; and a third sensing electrode extending in a second direction other than the first direction on at least one of one surface and an opposite surface of the second substrate, wherein the first sensing electrode and the second sensing electrode are disposed on a region where the first sensing electrode and the second sensing electrode are offset from each other.

According to the embodiment, there is provided a touch panel including: a cover window; a first substrate on the cover window; a second substrate on the first substrate; a third substrate on the second substrate; a first sensing electrode extending in a first direction on at least one of one surface and an opposite surface of the first substrate; a second sensing electrode extending in the first direction on at least one of one surface and an opposite surface of the second substrate; and a third sensing electrode extending in a second direction other than the first direction on at least one of one surface and an opposite surface of the third substrate, wherein the first sensing electrode and the second sensing electrode are disposed on a region where the first sensing electrode and the second sensing electrode are offset from each other.

In the touch panel according to the embodiment, the first sensing electrode and the second sensing electrode aligned in a first direction may be disposed on one surface and an opposite surface of the substrate or may be offset from each other on the first substrate and the second substrate. Accordingly, the unactive area UA defined on the substrate for wire electrodes, which are electrically connected to the first sensing electrode and the second sensing electrode, may be reduced. That is, the bezel area can be reduced at the left and right portions of the touch panel.

Therefore, in the touch panel according to the embodiment, since sensing electrodes are offset from each other on the substrates so that an occupied area of the wire electrodes can be reduced as compared with a case where the sensing electrodes are disposed on one surface of the substrate, a width of the bezel area can be reduced at left and right portions of the touch panel.

DETAILED DESCRIPTION

Figure 1:
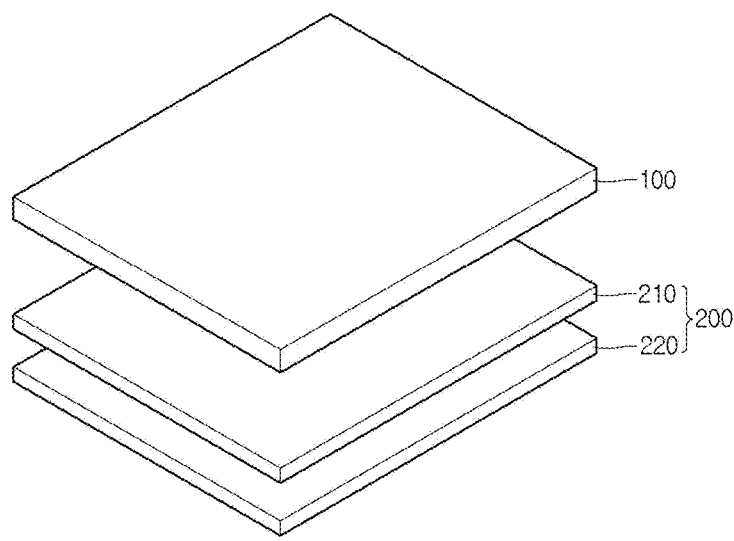
FIG. 1 is a perspective view showing a touch panel according to a first embodiment.

In the following description of the embodiments, it will be understood that, when a layer (film), a region, a pattern or a structure is referred to as being "on" or "under" a substrate, another layer (film), region, pad or patterns, it can be "directly" or "indirectly" on the other layer (film), region, pattern or structure, or one or more intervening layers may also be present. Such a position of each layer described with reference to the drawings.

The thickness and size of each layer (film), region, pattern or structure shown in the drawings may be exaggerated, omitted or schematically drawn for the purpose of convenience or clarity. In addition, the size of each layer (film), region, pattern or structure does not utterly reflect an actual size.

Hereinafter, the embodiment will be described in detail with reference to accompanying drawings.

Referring to FIGS. 1 to 4, the touch panel according to the first embodiment may include a cover window 100, a first substrate 210 deposed on the cover window 100, and a second substrate 220 disposed on the first substrate 210.

The cover window 100 includes glass or plastic. For example, the cover window 100 may include strengthened glass, half-strengthened glass, sodalime glass, strengthened plastic, or flexible plastic.

The cover window 100 may include an active area AA and an unactive area UA. The active area AA signifies an area through which a touch instruction of a user may be input. In addition, the unactive area UA has the concept opposite to that of the active area AA, that is, the unactive area UA is not activated even if a user touches the unactive area UA, so the unactive area UA signifies an area through which any touch instructions cannot be input.

The first substrate 210 and the second substrate 220 may be disposed on the cover window 100. In detail, the first substrate 210 may be disposed on the cover window 100, and the second substrate 220 may be disposed on the first substrate 210.

The cover window 100, the first substrate 210, and the second substrate 220 may be bonded to each other by an adhesive. In detail, the cover window 100, the first substrate 210, and the second substrate 220 may be bonded to each other by an optical clear adhesive.

At least one of the first substrate 210 and the second substrate 220 may include plastic. In detail, at least one of the first substrate 210 and the second substrate 220 may include poly ethylene terephthalate (PET). However, the embodiment is not limited thereto. The first substrate 210 and the second substrate 220 may include various materials on which a sensing electrode may be disposed.

The sensing electrode may be disposed on the active area AA of the first substrate 210. In detail, a first sensing electrode 410 may be disposed on one surface 210a of the first substrate 210, and a second sensing electrode 420 may be disposed on an opposite surface 210b opposite to the one surface of the first substrate 210.

Further, a third sensing electrode 430 may be disposed on the active area AA of the second substrate 220. In detail, the third sensing electrode 430 may be disposed on one of the one surface and the opposite surface of the second substrate 220.

The first sensing electrode 410, the second sensing electrode 420, and the third sensing electrode 430 may include a conductive material. For example, the first sensing electrode 410, the second sensing electrode 420, and the third sensing electrode 430 may include at least one selected from the group consisting of indium tin oxide (ITO), indium zinc oxide (IZO), copper oxide, carbon nano tube (CNT), and Ag nano wire.

Figure 2:
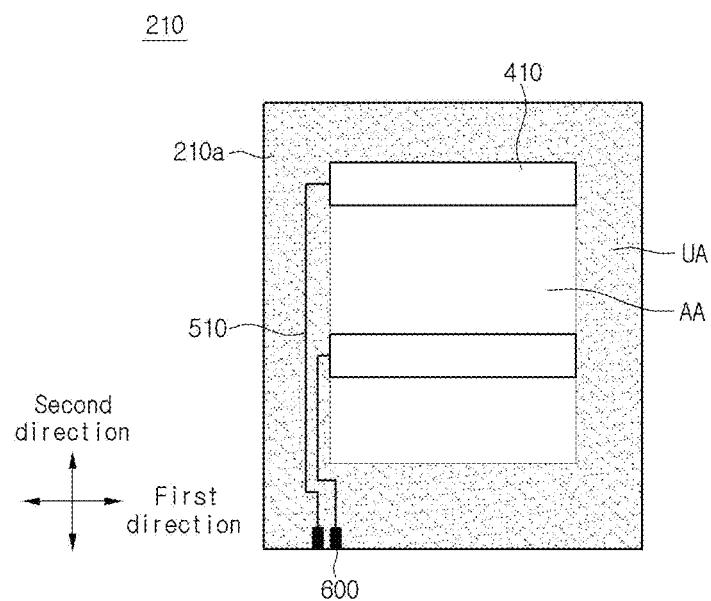
FIG. 2 is a view showing a top surface of one surface of a first substrate in the touch panel according to a first embodiment.
Figure 3:
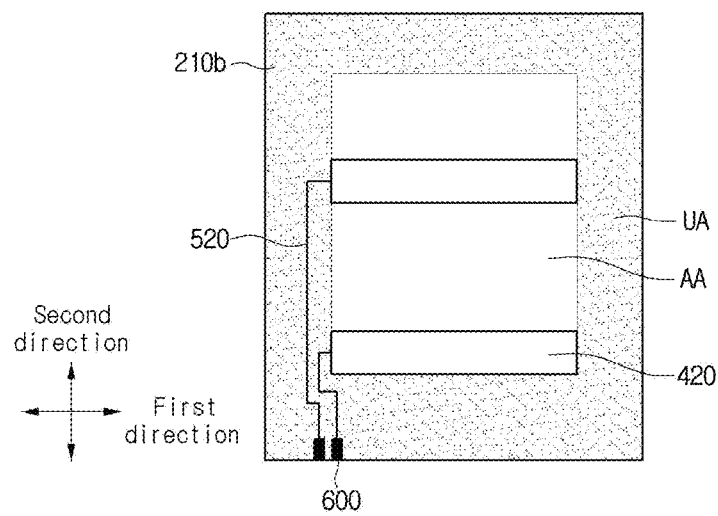
FIG. 3 is a view showing a top surface of an opposite surface of a first substrate in the touch panel according to a first embodiment.

The first sensing electrode 410 and the second sensing electrode 420 may be disposed on the one surface 210a and the opposite surface 210b of the first substrate 210, respectively. Referring to FIGS. 2 and 3, the first sensing electrode 410 and the second sensing electrode 420 may be offset from each other. In detail, the first sensing electrode 410 and the second sensing electrode 420 may be disposed alternatively.

The first sensing electrode 410 and the second sensing electrode 420 may extend in a first direction. For example, the first sensing electrode 410 and the second sensing electrode 420 may be transversely disposed.

In this case, the first sensing electrode 410 and the second sensing electrode 420 disposed on the one surface 210a and the opposite surface 210b of the first substrate 210 may be offset from each other.

In detail, when a plurality of rows defining a width of the first substrate 210 are defined, the first sensing electrode 410 deposed on the one surface 210a of the first substrate 210 is formed on an odd numbered row, and the second sensing electrode 420 deposed on the opposite surface 210b of the first substrate 210 is formed on an even numbered row. In addition, the first sensing electrode 410 may be disposed at the even numbered row, and the second sensing electrode 420 may be disposed at the odd numbered row. That is, the first sensing electrode 410 and the second sensing electrode 420 may be disposed at a region where the first sensing electrode 410 and the second sensing electrode 420 are not overlapped with each other.

A wire electrode may be disposed at an unactive region UA of the first substrate 210. In detail, a first wire electrode 510 electrically connected to the first sensing electrode 410 may be disposed on the one surface 210a of the first substrate 210. Further, a second wire electrode 520 electrically connected to the second sensing electrode 420 may be disposed on the opposite surface 210b of the first substrate 210.

The first wire electrode 510 and the second wire electrode 520 may be drawn upward or downward from the first substrate 210, and may be connected to an electrode part of a printed circuit board (not shown) through the pad part 600.

Figure 4:
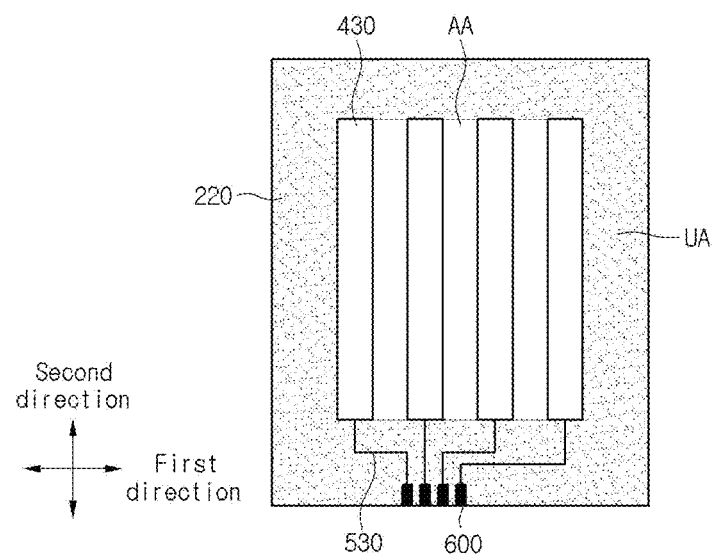
FIG. 4 is a view showing a top surface of one surface of a second substrate in the touch panel according to a first embodiment.

Referring to FIG. 4, the third sensing electrode 430 may be disposed on one of one surface of the second substrate 220 and an opposite surface of the second substrate 220. That is, the third sensing electrode 430 may be disposed on at least one of one surface facing the second sensing electrode 420 and an opposite surface of the second sensing electrode 420.

The third sensing electrode 430 may extend in a direction other than the first direction. In detail, the third sensing electrode 430 may extend in a second direction other than the first direction. For example, the third sensing electrode 430 may vertically extend.

A wire electrode may be disposed on the unactive area UA of the second substrate 220. In detail, a third wire electrode 530 electrically connected to the third sensing electrode 430 may be disposed on one surface or an opposite surface of the second substrate 220.

The third wire electrode 530 may be drawn upward or downward from the second substrate 220, and may be connected to an electrode part of a printed circuit board (not shown) through the pad part 600.

The first wire electrode 510, the second wire electrode 520, and the third wire electrode 530 may include a metallic material. For example, the first wire electrode 510, the second wire electrode 520, and the third wire electrode 530 may include a metallic material such as silver (Ag) or copper (Cu).

In the touch panel according to the first embodiment, a first sensing electrode and a second sensing electrode disposed in the first direction may be offset from each other on one surface and an opposite surface of the first substrate. Accordingly, the unactive area UA of wire electrodes electrically connected to the first sensing electrode and the second sensing electrode on the substrate may be reduced. That is, the bezel area may be reduced at left and right portions of the touch panel.

That is, in the touch panel according to the first embodiment, since sensing electrodes are offset from each other on one surface and an opposite surface of the substrate so that an occupied area of the wire electrode may be reduced as compared with a case where the sensing electrode is disposed on one surface of the substrate, a width of the bezel area can be reduced at left and right portions of the touch panel.

Hereinafter, a touch panel according to a second embodiment will be described with reference to FIGS. 5 to 8. The details of structures and components of the touch panel the same as or similar to those in the touch panel the first embodiment will be omitted. That is, the description of the touch panel according to the second embodiment may be basically incorporated with the description of the touch panel according to the first embodiment.

Figure 5:
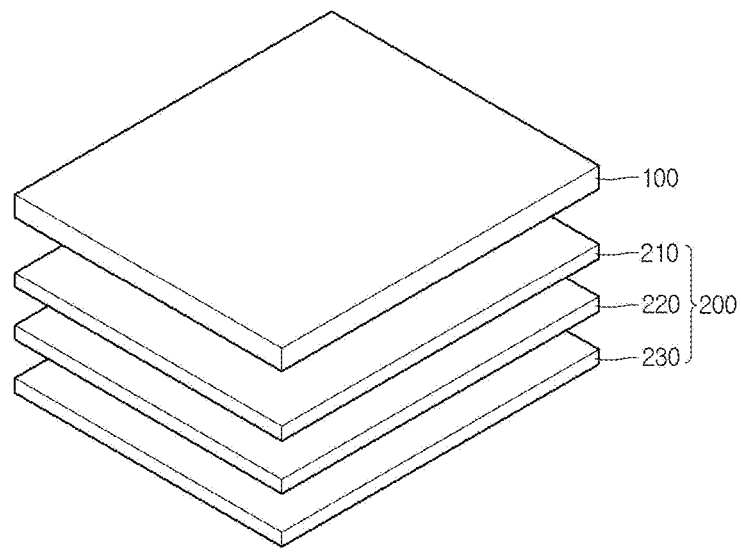
FIG. 5 is a perspective view showing a touch panel according to a second embodiment.

Referring to FIG. 5, a touch panel according to the second embodiment may include a cover window 100, a first substrate 210 disposed on the cover window 110, a second substrate 220 disposed on the first substrate 210, and a third substrate 230 disposed on the second substrate 220.

The cover window 100, the first substrate 210, the second substrate 220, and the third substrate 220 may be bonded to each other by an adhesive. In detail, the cover window 100, the first substrate 210, the second substrate 220, and the third substrate 220 may be bonded to each other by an optical clear adhesive.

A sensing electrode may be disposed on the active area AA of the first substrate 210. In detail, a first sensing electrode 410 may be disposed on at least one of one surface of the first substrate 210 and an opposite surface opposite to the one surface of the first substrate 210.

A sensing electrode may be disposed on the active area AA of the second substrate 220. In addition, a second sensing electrode 420 may be disposed on at least one of one surface of the second substrate 220 and an opposite surface opposite to the one surface of the second substrate 220.

A sensing electrode may be disposed on the active area AA of the third substrate 230. In addition, the third sensing electrode 430 may be disposed on at least one of one surface of the third substrate 230 and an opposite surface opposite to the one surface of the third substrate 230.

Figure 6:
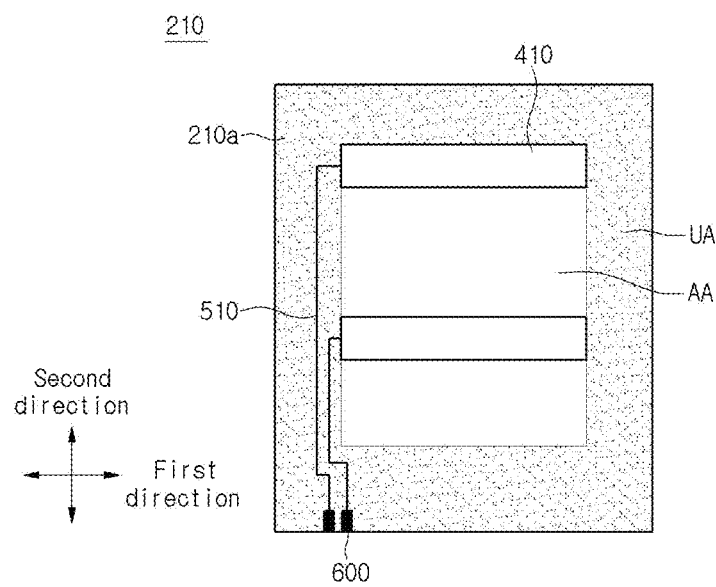
FIG. 6 is a view showing a top surface of one surface of a first substrate in the touch panel according to a second embodiment.
Figure 7:
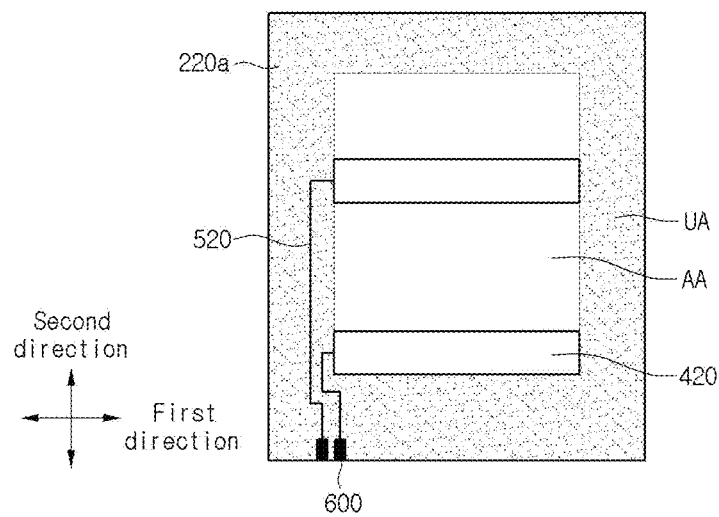
FIG. 7 is a view showing a top surface of an opposite surface of a second substrate in the touch panel according to a second embodiment.

Referring to FIGS. 6 and 7, the first sensing electrode 410 and the second sensing electrode 420 may extend in a first direction. For example, the first sensing electrode 410 and the second sensing electrode 420 may be transversely disposed.

In this case, the first sensing electrode 410 and the second sensing electrode 420 disposed on the one surface and the opposite surface 220b of the first substrate 210 may be offset from each other.

In detail, on the assumption that the first substrate 210 and the second substrate 220 have the same size and a plurality of rows defining widths of the first substrate 210 and the second substrate 220 are defined, the first sensing electrode 410 deposed on the first substrate 210 is aligned on an odd numbered row, and the second sensing electrode 420 deposed on the second substrate 220 is aligned on an even numbered row. In addition, the first sensing electrode 410 may be disposed at the even numbered row, and the second sensing electrode 420 may be disposed at the odd numbered row.

A wire electrode may be disposed on an unactive region UA of the first substrate 210 and the second substrate 220. In detail, a first wire electrode 510 electrically connected to the first sensing electrode 410 may be disposed on the unactive area UA of the first substrate 210. Further, a second wire electrode 520 electrically connected to the second sensing electrode 420 may be disposed on the unactive area UA of the second substrate 220.

The first wire electrode 510 and the second wire electrode 520 may be drawn upward or downward from the first substrate 210 and the second substrate 220, and may be connected to an electrode part of a printed circuit board (not shown) through the pad part 600.

Figure 8:
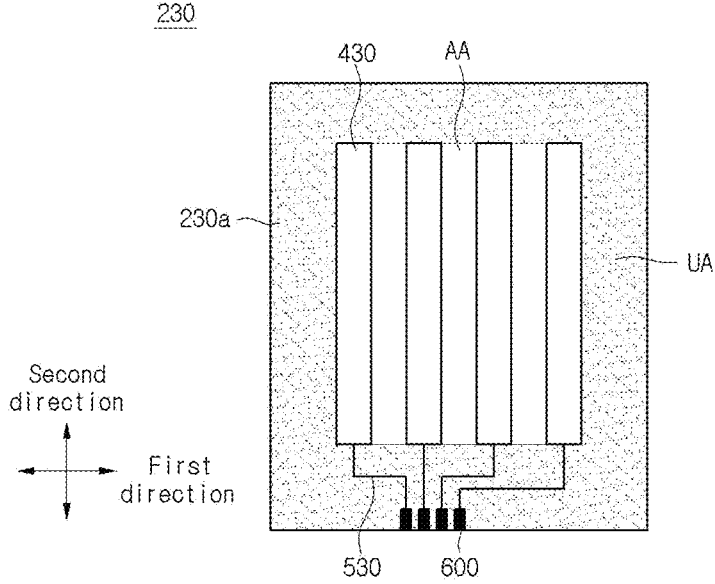
FIG. 8 is a view showing a top surface of one surface of a third substrate in the touch panel according to a second embodiment.

Referring to FIG. 8, the third sensing electrode 430 may be disposed on one of one surface of the third substrate 230 and an opposite surface of the third substrate 230. That is, the third sensing electrode 430 may be disposed on at least one of a surface facing the second substrate 220 and an opposite surface of the second substrate 220.

The third sensing electrode 430 may extend in a direction other than the first direction. In detail, the third sensing electrode 430 may extend in a second direction other than the first direction. For example, the third sensing electrode 430 may vertically extend.

A wire electrode may be disposed on the unactive area UA of the third substrate 230. In detail, the third wire electrode 530 electrically connected to the third sensing electrode 430 may be disposed on one surface or an opposite surface of the third substrate 230.

The third wire electrode 530 may be drawn upward or downward from the third substrate 230, and may be connected to an electrode part of a printed circuit board (not shown) through the pad part 600.

In the touch panel according to the second embodiment, a first sensing electrode and a second sensing electrode disposed in the first direction may be offset from each other on the first and second substrates. Accordingly, the unactive area UA of wire electrodes electrically connected to the first sensing electrode and the second sensing electrode on the substrate may be reduced. That is, the bezel area may be reduced at left and right portions of the touch panel.

That is, in the touch panel according to the embodiment, since sensing electrodes are offset from each other on the substrates so that an occupied area of the wire electrode may be reduced as compared with a case where the sensing electrode is disposed on one surface of the substrate, a width of the bezel area can be reduced at left and right portions of the touch panel.

The features, structures, and effects described in the above embodiments are included in at least one embodiment of the present invention, and are not necessarily limited to only one embodiment. Moreover, the features, structures, and effects described in the embodiments may also be combined or modified to be carried out in other embodiments by those skilled in the art to which the embodiments pertain. Thus, the contents related to the combination and modification shall be construed to be included in the scope of the present invention.

Further, although the embodiments have been mainly described until now, they are just exemplary and do not limit the present invention. Thus, those skilled in the art to which the present invention pertains will know that various modifications and applications which have not been exemplified may be carried out within a range which does not deviate from the essential characteristics of the embodiments. For example, the constituent elements described in detail in the exemplary embodiments can be modified to be carried out. Further, the differences related to such modifications and applications shall be construed to be included in the scope of the present invention specified in the attached claims.

What is claimed is:
1. A touch panel comprising:
a cover window;
a first substrate on the cover window;
a second substrate on the first substrate;
a first sensing electrode extending in a first direction on one surface of the first substrate;
a second sensing electrode extending in the first direction on an opposite surface of the first substrate; and a third sensing electrode extending in a second direction other than the first direction on at least one of one surface and an opposite surface of the second substrate, wherein the first sensing electrode and the second sensing electrode are disposed on a region where the first sensing electrode and the second sensing electrode are offset from each other, wherein a plurality of rows in the first direction of the first substrate is defined, wherein the first sensing electrode on the one surface of the first substrate is formed on an odd-numbered row, and the second sensing electrode disposed on the opposite surface of the first substrate is formed on an even-numbered row, and wherein each of the first sensing electrode and the second sensing electrode comprises a part that overlaps with the third sensing electrode.

2. The touch panel of claim 1, wherein the third sensing electrode is disposed at the one surface of the second substrate.

3. The touch panel of claim 1, wherein the first sensing electrode, the second sensing electrode, and the third sensing electrode comprise a same material.

4. The touch panel of claim 3, wherein the first sensing electrode, the second sensing electrode, and the third sensing electrode comprise at least one selected from the group consisting of indium tin oxide, indium zinc oxide, carbon nano tube (CNT), conductive polymer, and Ag nano wire.

5. The touch panel of claim 1, wherein each of the first substrate and the second substrate comprise an active area and an unactive area, the first and second sensing electrodes are disposed on the active area, of the first substrate, and the third sensing electrode is disposed on the active area of the second substrate, and the touch panel further comprises a wire electrode disposed on the unactive areas of the first and second substrates, respectively, and connected to the first to third sensing electrodes, respectively.

6. The touch panel of claim 1, further comprising:

a first wire electrode connected to the first sensing electrode;

a second wire electrode connected to the second sensing electrode; and a third wire electrode connected to the third sensing electrode, wherein the first sensing electrode is aligned on a same plane with the first wire electrode, the second sensing electrode is aligned on a same plane with the second wire electrode, and the third sensing electrode is aligned on a same plane with the third wire electrode.

7. The touch panel of claim 1, further comprising:

a first optical clear adhesive between the cover window and the first substrate, wherein the first optical clear adhesive is in contact with the cover window and the first substrate.

8. The touch panel of claim 1, further comprising:

a second optical clear adhesive between the first substrate and second substrate, wherein the second optical clear adhesive is in contact with the first substrate and second substrate.

9. The touch panel of claim 1, wherein at least one of the first substrate and the second substrate includes poly ethylene terephthalate (PET).

* * * * *